H. JACOB.
BASE LINE TELEMETER.
APPLICATION FILED NOV. 10, 1908.
1,108,180.
Patented Aug. 25, 1914.
2 SHEETS—SHEET 2.
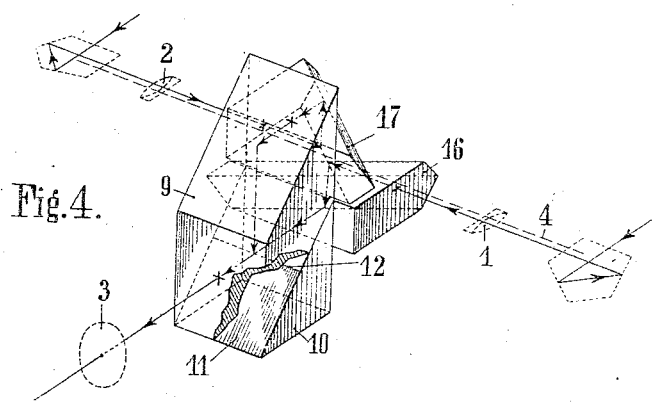
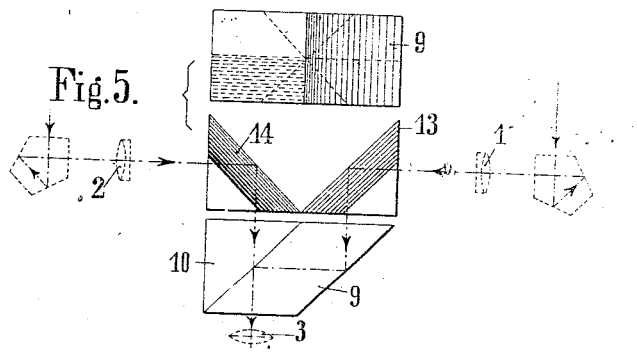
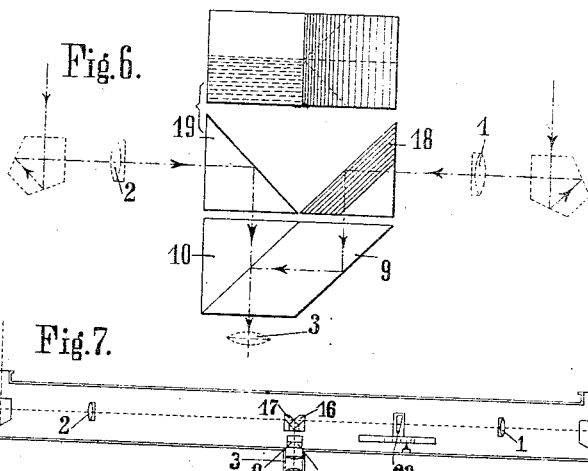
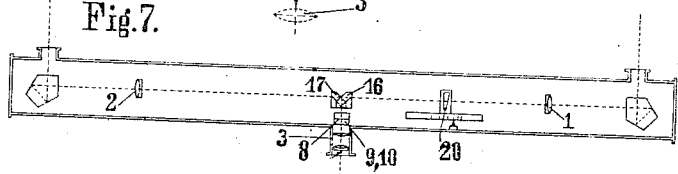
Witnesses:
Frank E. Roffman
May J. Trindle
Inventor:
Heinrich Jacob
by Dickerson, Brown, Raegener & Pfalz
Attys.

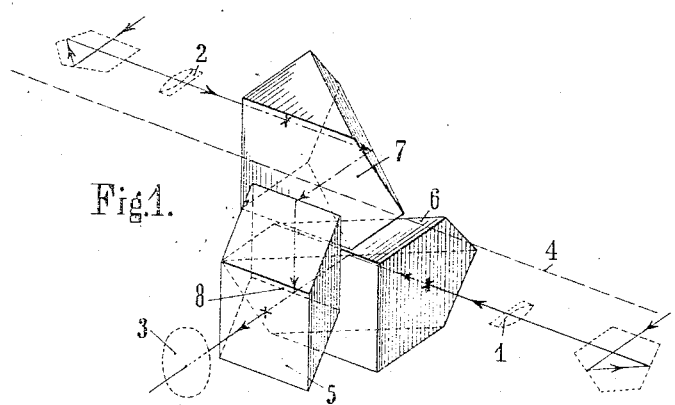
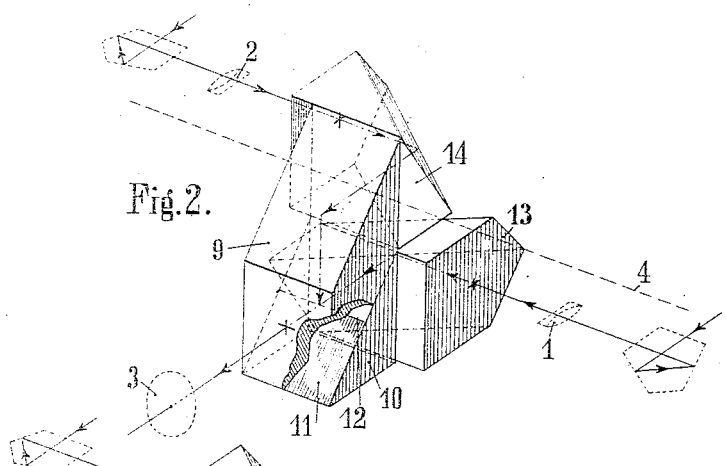
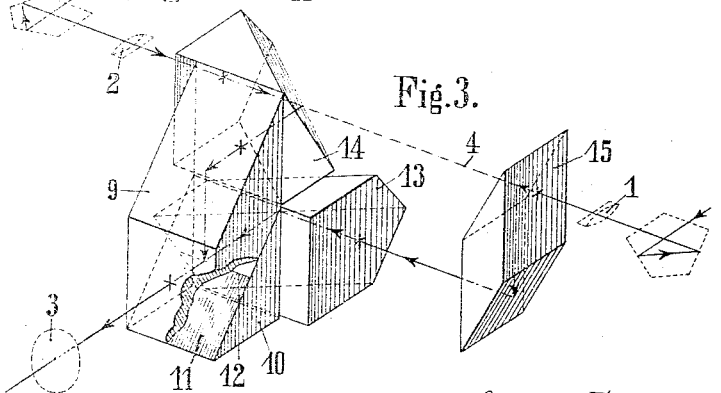

UNITED STATES PATENT OFFICE.

HEINRICH JACOB, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

BASE-LINE TELEMETER.

1,108,180.  Specification of Letters Patent.   Patented Aug. 25, 1914.

Application filed November 10, 1908. Serial No. 461,982.

*To all whom it may concern:*

Be it known that I, HEINRICH JACOB, a citizen of the German Empire, and resident of Steglitz, near Berlin, Germany, engineer, have invented certain new and useful Improvements in Base-Line Telemeters with Two Objectives and One Ocular, of which the following is a specification.

In the case of base-line telemeters with two objectives and one ocular, in which, for the purpose of measurement, the rays thrown by the objectives from the ends of the base-line toward the center of the instrument are received by an image-uniting ocular prism device and thrown into the ocular, it is necessary to bring the two part images into particular positions relative to each other, by suitable adjustment of the instrument. The accuracy of the measurement depends in part on the non-sensitiveness of the instrument to vibrations and in part on the precision of the adjustment.

The new base-line telemeter which constitutes the subject matter of the present invention affords advantages in both respects especially by a new form of image uniting prism device.

The essential feature of the new ocular prism consists therein that it has two pairs of substantially parallel surfaces, the one pair being inclined to the other and arranged in such a manner that the one pair allows the rays coming from one objective to pass through to the ocular in a substantially straight line, without reflection and that the second pair of surfaces emits to the ocular the rays coming from the other objective after double reflection, in the same direction as the first mentioned rays. In using an ocular prism thus constituted, that is to say, a rhombohedral prism, the dividing line between the two image parts produced by the two objectives which appears in the field of the ocular, is formed by the edge of one reflecting surface of the prism. This edge may coincide with an edge of the prism, or may lie on one of the prism surfaces, removed from the prism edge. In the latter case it is necessary to build up the ocular prism from the rhombohedral prism referred to and another prism placed against one of the prism surfaces inclined to the base line of the instrument, so that the rays falling on to the rhombohedral prism outside the reflecting part of the prism surface can pass through substantially without refraction.

The advantage of the new ocular prism construction lies primarily therein that the rays either pass through substantially unrefracted and unreflected, in straight lines, or are reflected by two surfaces, so that slight displacements of the rhombohedral prism device of the instrument are practically harmless, the effect of the displacement of one reflecting surface being neutralized by the simultaneous displacement of the other reflecting surface inasmuch as a ray impinging on the rhombohedral prism device in a definite direction leaves such prism device parallel to the impinging ray irrespective of any slight displacement of the rhombohedral prism device which may occur. This can easily be ascertained by a simple geometrical demonstration showing that each displacement of the rhombohedral prism device with relation to a ray impinging thereon causes a deviation of the ray after reflection at the first reflecting surface of the rhombohedral prism depending from the displacement of this reflecting surface with relation to the ray. The displacement of the second reflecting surface of the rhombohedral prism being equal to the displacement of the first reflecting surface it effects a deflection of the ray coming from the first reflecting surface in the opposite sense so that the ray leaving the rhombohedral prism after double reflection retains the same direction as if no displacement at all of the rhombohedral prism had taken place. With regard to the rays passing through the rhombohedral prism without reflection said rhombohedral prism simply acts as a parallel-faced glass plate. It is, therefore, clear that the direction of these rays passing without reflection is likewise not affected by a slight displacement of the rhombohedral prism device. It results therefrom that the images produced in the field of view are in no way affected by slight displacements of the rhombohedral prism device which eventually may take place under conditions of use of the instrument.

Another advantage is that the prism construction allows of so positioning the prism that the image dividing line is substantially parallel to the plane of the measuring triangle and perpendicular to the axis of the rays, which pass through the ocular prism without reflection. With this arrangement of the dividing line it is possible to make the latter appear sharp throughout its length, whereas a dividing line formed by the edge of a mirror coating or a surface as in the case of previously known ocular prisms of coincidence telemeters, is only sharp as regards a limited portion of its length, the remaining part being blurred by reason of the fact that the line only cuts the image plane at one point, and precise adjustment is thus rendered difficult.

The annexed drawing shows several constructions of ocular prisms according to the invention, the general construction of the base line telemeter being only diagrammatically indicated in some of the figures, in view of the fact that it is well known.

Figure 1 is a perspective of an image uniting ocular prism device with a simple rhombohedral prism as ocular prism, indicating at the same time diagrammatically the essential optical elements of a telemeter. Fig. 2 shows an image uniting device in which the ocular prism proper consists of a rhombohedral prism and a three cornered rectangular prism cemented thereto. Fig. 3 shows the ocular prism represented in Fig. 2 in conjunction with a prefixed prism arrangement which transmits to the ocular prism the rays from entrance lenses located at the same height. Fig. 4 shows the ocular prism represented in Fig. 2 in conjunction with another arrangement of prefixed prism for deflecting the rays from the entrance lenses of the instrument to the ocular prism. Fig. 5 shows an arrangement in which the dividing line intersects the image plane at a point. Fig. 6 shows a prism arrangement according to the present invention in which the resultant images, separated from each other by a dividing line, do not produce a complete image of the object on which the telemeter is trained, but two half images, one of which is upright and the other reversed. Fig. 7 shows the arrangement of the prisms in a telemeter.

In the construction of the telemeter shown in Fig. 1 the two objectives of the instrument are marked 1 and 2, and the ocular is marked 3. The base line of the instrument is indicated by the dotted line 4. The ocular prism is marked 5. This is a rhombohedral prism that is to say a prism with two pairs of substantially parallel surfaces, which intersect each other at an acute angle. One pair of surfaces is substantially parallel with the base line 4. On the rear side of the ocular prism 5 there are two three cornered substantially right-angled so-called Amici prisms 6 and 7, the roof-edges of which cross each other, and the entrance surfaces of which, facing the respective objectives, are substantially parallel with each other and perpendicular to the base line. The path of the axial rays through the ocular prism is indicated by dotted lines. The united ray of both half images passing out of the ocular prism is indicated by a solid line.

The action of the instrument described is as follows: The rays coming from the objective or entrance lens 1 of the instrument fall upon the opposed surfaces of the roof edge prism 6: after reflection by the roof surface they pass out of the prism 6 to the rear surface of the rhombohedral prism, i. e. the surface directed away from the ocular, and this surface allows them to pass through freely. These rays pass unrefracted through the rhombohedral prism to the ocular. The rays coming from the objective 2 fall substantially perpendicularly on to the opposed surfaces of the roof edge prism 7 and pass, after reflection by the roof edge, out of the prism to the rear surface of the rhombohedral prism, which they enter unrefracted. These rays, however, fall upon the upper inclined surface of the rhombohedral prism, by which they are reflected to the lower inclined surface, and are thrown by the latter out of the prism, so that they enter the ocular tube parallel with the rays coming from the objective 1. Each objective produces after the passage of the rays through the prism system, only a half image, which is perceived through the ocular 3: the two half images abut together at the image of the edge 8 of the rhombohedral prism. The latter is so arranged that the edge 8 is in an image plane of the instrument so that this edge i. e. the dividing line of the image, appears sharp throughout its length.

In the construction of the telemeter shown in Fig. 2 the objectives are again marked 1 and 2; the ocular is marked 8 and the base line 4. The ocular prism is in this case composed of a rhombohedral prism 9 and a three cornered substantially rectangular prism 10, one polished cathetus surface of which is substantially in the same plane as that surface of the rhombohedral prism which faces away from the objective. The contact surface of the two prisms is in part provided with a reflecting coating 11, the border line 12 of which is the dividing line between the two part images appearing in the field of view. In this case also there is on the rear side of the ocular prism a pair of three cornered substantially triangular roof edge prisms 13 and 14 with cathetus surfaces substantially perpendicular to the base line.

The arrangement shown in Fig. 2, involving the provision between prisms 9 and 10 of a reflecting layer 11, the border line 12 of which constitutes the dividing line between the two partial images appearing in the field of view, has several practical advantages over the construction shown in Fig. 1, in which the edge 8 of the prism 5 constitutes such dividing line; one of these advantages of the Fig. 2 construction being that the edge 12 of the reflecting layer forms a very thin and fine dividing line—a dividing line much thinner than that which can be formed by any practicably sharp edge 8 of the prism 5 of Fig. 1. The exactness of adjustment of the telemeter depends very largely on the certainty with which the observer can determine the position of the dividing line between the images. If this dividing line have appreciable breadth (as it must have practically in the construction shown in Fig. 1) then the breadth of this dividing line prevents direct contact of the image above that line with the image below that line, and consequently the observer will commonly have difficulty in determining the exact adjustment to give strict coincidence of the images above and below the dividing line. Since the accuracy of the determination of distance by this instrument depends primarily upon the production of strict coincidence of the images above and below the dividing line, any feature which makes the determination of the position of exact coincidence of such images difficult, or impossible, is objectionable. Although, in the construction shown in Fig. 1, the dividing line between images (edge 8 of the prism 5) need never be very broad, yet the unavoidable slight breadth of the dividing line 8, in the Fig. 1 construction, does constitute an appreciable obstacle to the determination of the adjustment at which exact coincidence of the image exists. As is well known, reflecting layers, such as the layer 11, may be of almost molecular thinness. Also, the line 12 may be made practically straight and smooth, even when examined under the microscope. It follows therefore that an edge such as the edge 12, of the reflecting layer 11, constitutes practically the thinnest possible and most accurate possible dividing line between the images: a dividing line the breadth of which is not perceptible to the observer, who may therefore, without difficulty, and without the exercise of judgment or skill, produce exact coincidence of the images above and below the dividing line.

Additional advantages of the Fig. 2 construction are, that the reflecting layer 11 is entirely protected against external injury, by the two prisms, 9 and 10; and that the dividing line 12 cannot be obscured or blurred by dust and the like. The prism edge 8 of the Fig. 1 construction is necessarily exposed to injury, and its sharpness may be diminished by adhering dust and the like.

In the arrangement shown in Figs. 1 and 2 the objectives or entrance lenses of the instrument must be at different levels, owing to the vertical displacement of the axial ray sections entering the ocular prism from the two objectives; this displacement arises from the shape of the ocular prism. Various means may be adopted for avoiding the awkwardness and increase of diameter of the base tube arising from this. One method is illustrated in Fig. 3. In this case a rhombohedral prism 15 is placed in front of one of the roof edge prisms 13, 14 to produce in the known manner parallel displacement of the rays entering the instrument from the objective 1. In other respects the construction shown in Fig. 3 in no way differs from that shown in Fig. 2.

Instead of using a separate interposed prism for equalizing the vertical displacement of the axial ray sections entering the ocular prisms, the same purpose may be effected by a special construction of the interposed roof edge prisms 13 and 14, by utilizing the fact that in the finally produced image only about half the rays coming from each objective are used. It is therefore allowable to limit the height of the roof edge prisms placed in front of the objective, so that they cannot let through the entire circular pencil of rays coming from the objective, but only about half or rather more than half. The roof edges of the two roof edge prisms are thus brought more closely together than in the construction in which the prisms give passage to the entire circular pencils of rays. This bringing together of the roof edges involves the shifting of the objective center by twice the amount toward a common axis, or toward the base line.

The arrangement with roof edge prisms of restricted thickness is illustrated in Fig. 4. The roof edge prisms are marked 16, 17, and the other parts, which are unchanged as compared with Fig. 2, are designated in the same way as in Fig. 2. The path of the axial ray sections passing through the ocular prism is also indicated in the same way as before. It will be seen that with this arrangement also it becomes possible to have the position of the objectives central with regard to the base line.

Fig. 5 shows the cemented ocular prism represented in Figs. 2 to 4 in a position obtained by rotation through 90 degrees from the position shown in the latter figures, the two interposed roof edge prisms being accordingly side by side instead of one above the other. The elements of the telemeter bear the same designations as in Fig. 2. This arrangement differs, in its effect, from that shown in Fig. 2 by the fact that the image dividing line intersects the image plane of the instrument and is, therefore only sharp at the part intersecting the plane, but blurred on both sides.

In the modifications of the prism arrangement hereinbefore set forth it is assumed that the rays coming from each of the two objectives are transmitted to the ocular prism by a separate roof edge prism. If this is the case a telemeter is obtained in which the images separated by the dividing line are complementary and constitute a complete image of the object on which the telemeter is trained. The said modifications therefore produce so-called coincidence telemeters. There is, however, no obstacle to designing the telemeter, with the new ocular prism, as an inversion telemeter, having in front of the ocular prism only one roof edge prism and a simple reflector or a prism with a single reflecting surface. A construction of this kind is shown in Fig. 6, with the prisms arranged as in Fig. 5, the roof edge prism in front of the ocular prism being marked 18, and the second, three cornered substantially right angled prism being marked 19. The other parts are marked as in Figs. 2 to 5.

The combination of the several elements to form a complete instrument is shown in Fig. 7. The adjustment of the images separated by a dividing line is in this case effected in a known manner by means of a movable wedge 20. The prism arrangement selected is that shown in Fig. 4.

What I claim as my invention and desire to secure by Letters Patent of the United States is:

1. In a base line telemeter, two objectives, one ocular, reflectors and a prismatic device, the said reflectors arranged in the path of the rays from the objectives and adapted to transmit such rays through the prismatic device, and said prismatic device comprising two parallel reflecting surfaces arranged in planes at angles to the measuring triangle, whereby a coincidence of rays from said reflectors occurs in said prismatic device, producing two adjacent images in the ocular.

2. In a base line telemeter two objectives, one ocular, an image uniting ocular prism device and reflectors inserted in the path of the rays and adapted to throw the rays coming from said objectives on said ocular prism device, said ocular prism device being provided with two surfaces substantially parallel with each other and further provided with two surfaces likewise substantially parallel with each other but obliquely to the first named surfaces, the pairs of surfaces arranged in such a manner that one pair of surfaces is perpendicular both to the axis of the ocular in front of said ocular prism device and to the axis of the rays thrown thereon by said reflectors in rear of the prism device, whereas the other pair arranged obliquely to the first named pair forms two reflecting surfaces whereby a coincidence of rays from said reflectors occurs in said ocular prism device and thus two adjacent partial images are produced in the field of view of the ocular.

3. In a base line telemeter two objectives, one ocular an image uniting ocular prism device and reflectors inserted in the path of the rays and adapted to throw the rays coming from said objectives on said ocular prism device, said ocular prism device provided with two surfaces substantially parallel with each other and with the base line of the instrument and further provided with two surfaces likewise substantially parallel with each other and with the base line but obliquely to the first named surfaces, the pairs of surfaces arranged in such a manner that one pair of surfaces is perpendicular both to the axis of the ocular in front of said ocular prism device and to the axis of the rays thrown thereon by said reflectors in rear of the prism device, whereas the other pair arranged obliquely to the first named pair forms two reflecting surfaces whereby a coincidence of rays from said reflectors occurs in said ocular prism device and thus two adjacent partial images are produced in the field of view of the ocular.

4. In a base line telemeter two objectives, one ocular, an image uniting ocular prism device, and reflectors inserted in the path of the rays and adapted to throw the rays coming from said objectives on said ocular prism device, the last named prism device consisting of a rhombohedral prism, that is to say a prism with two pairs of parallel surfaces inclined to each other, and a further prism contacting with one of its surfaces with one surface of said rhombohedral prism and having a further surface in substantially the same plane as that surface of the rhombohedral prism which is remote from the ocular, the contact surface of the two prisms, forming the ocular prism, intersecting the image plane of the ocular and being in part provided with a reflecting coating, the edge of which forms the dividing line of the two parts of the image produced by the two objectives.

5. In a base line telemeter two objectives, one ocular, an image uniting ocular prism device and reflectors inserted in the path of the rays and adapted to throw the rays coming from said objectives on said ocular prism device, the last named prism device comprising two prisms contacting with each other, the contact surface crossing an image plane of the instrument and being in part provided with a reflecting coating the edge of which forms the dividing line of the two parts of the image produced by the two objectives, said edge being parallel to the plane of the measuring triangle and perpendicular to the axis of the rays which pass through that part of said contact surface which is not provided with a reflecting coating, so as to appear sharp throughout its length.

6. In a base line telemeter two objectives, one ocular, an image uniting ocular prism device and reflectors inserted in the path of the rays and adapted to throw the rays coming from said objectives on said ocular prism device the latter comprising a rhombohedral prism and a further prism contacting with one surface of said rhombohedral prism which is inclined to the plane of the measuring triangle of the instrument, said further prism provided with a surface in substantially the same plane with that surface of the rhombohedral prism which intersects the contact surface and is directed away from the ocular, the contact surface of said prisms being in part provided with a reflecting coating the edge of which forms the dividing line of the two partial images.

7. In a base line telemeter two objectives, one ocular, an image uniting ocular prism device comprising a rhombohedral prism, and reflectors inserted in the path of the rays and adapted to throw the rays coming from said objectives on said ocular prism device, said reflectors coöperating with the ocular prism comprising a pair of crossed reflectors at least one of which consists of a roof surface.

8. In a base line telemeter two objectives, one ocular, an image uniting ocular prism device comprising a rhombohedral prism, and reflectors inserted in the path of the rays and adapted to throw the rays coming from said objectives on said ocular prism device, said reflectors coöperating with the ocular prism comprising a pair of crossed reflectors each consisting of a roof surface of a prism body, the height of said roof edge prisms being such that the distance of the two parallel planes through the roof edges from each other is less than the distance of two planes through the axial rays entering the ocular prism device and parallel to the first mentioned planes from each other.

9. Prism combination consisting of a rhombohedral prism and a prism cemented thereto, the exposed polished surface of which is in substantially the same plane as that surface of the rhombohedral prism which makes with the cement surface an obtuse angle, the cement surface of the prisms being in part provided with a reflecting coating.

In testimony whereof I have signed this specification in the presence of two subscribing witnesses.

HEINRICH JACOB.

Witnesses:
HENRY HASPER,
WOLDEMAR HAUPT.

Copies of this patent may be obtained for five cents each, by addressing the "Commissioner of Patents, Washington, D. C."